United States Patent
Ahn et al.

(10) Patent No.: US 6,559,920 B1
(45) Date of Patent: May 6, 2003

(54) LIQUID CRYSTAL DISPLAY DEVICE AND METHOD OF MANUFACTURING THE SAME

(75) Inventors: Byung-Chul Ahn, Kyoungsangbuk-do (KR); Soon-Sung Yoo, Kyoungsangbuk-do (KR); Yong-Wan Kim, Kyoungsangnam-do (KR)

(73) Assignee: L G. Philips LCD Co., Ltd., Seoul (KR)

( * ) Notice: Subject to any disclaimer, the term of this patent is extended or adjusted under 35 U.S.C. 154(b) by 104 days.

(21) Appl. No.: 09/694,285

(22) Filed: Oct. 24, 2000

(30) Foreign Application Priority Data

Oct. 25, 1999 (KR) .............................. 99-46345

(51) Int. Cl.[7] .................. G02F 1/1343; G02F 1/136
(52) U.S. Cl. ................................ 349/187; 349/44
(58) Field of Search .................. 349/44, 110, 111, 349/43, 187

(56) References Cited

U.S. PATENT DOCUMENTS

| | | | | |
|---|---|---|---|---|
| 4,778,560 A | * | 10/1988 | Takeda et al. | 257/350 |
| 6,043,511 A | * | 3/2000 | Kim | 257/57 |
| 6,256,077 B1 | * | 7/2001 | Baek | 257/59 |

* cited by examiner

Primary Examiner—Robert H. Kim
Assistant Examiner—P. R. Akkapeddi
(74) Attorney, Agent, or Firm—Birch, Stewart, Kolasch & Birch, LLP

(57) ABSTRACT

The present invention discloses a method of manufacturing a liquid crystal display device, including: providing a substrate; depositing sequentially a first metal layer and a first insulating layer on the substrate; patterning the first metal layer and the first insulating layer using a first mask to form a gate line and a first gate insulating layer; depositing sequentially a second gate insulating layer, a pure semiconductor layer, a doped semiconductor layer and a second metal layer over the whole substrate; patterning the second metal layer using a second mask to form a data line, source and drain electrodes, a capacitor electrode, the capacitor electrode overlapping a portion of the gate line; etching the doped semiconductor layer between the source and drain electrodes to form a channel region; depositing a third insulating layer over the whole substrate; patterning the third insulating layer using a third mask to form a passivation film, the passivation film having a smaller width than the data line and covering the source and drain electrodes and exposing a portion of the drain electrode and the capacitor electrode; depositing a transparent conductive material layer over the whole substrate; and patterning the transparent conductive material layer using a fourth mask to pixel electrode, the pixel electrode contacting the drain electrode.

4 Claims, 9 Drawing Sheets

LIQUID CRYSTAL DISPLAY DEVICE AND METHOD OF MANUFACTURING THE SAME

CROSS REFERENCE

This application claims the benefit of Korean Patent Application No. 1999-46345, filed on Oct. 25, 1999, under 35 U.S.C. § 119, the entirety of which is hereby incorporated by reference.

BACKGROUND OF THE INVENTION

1. Field of the Invention

The present invention relates to a liquid crystal display device, and more particularly, to a liquid crystal display (LCD) device and a method of manufacturing the same.

2. Description of Related Art

FIG. 1 is a cross sectional view illustrating a typical LCD device. As shown in FIG. 1, the LCD device includes lower and upper substrates 2 and 4 with a liquid crystal layer 10 interposed therebetween. The lower substrate 2 has a thin film transistor "S" (TFT) as a switching element and a pixel electrode 14, and the upper substrate 4 has a color filter 8 and a common electrode 12. The pixel electrode 14 is formed over a pixel region "P" serves to apply a voltage to the liquid crystal layer 10 along with the common electrode 12, and the color filter 8 serves to implement natural colors. A selant 6 seals an edge of the lower and upper substrate 2 and 4 to prevent a leakage of the liquid crystal.

FIG. 2 is a plan view illustrating the lower array substrate of the typical LCD device. As shown in FIG. 2, the lower array substrate 2 includes gate lines 22 arranged in a transverse direction and data lines 24 arranged in a longitudinal direction perpendicular to the gate lines 22. The TFTs "S" are arranged near a crossing point of the gate and data lines 22 and 24. The pixel electrodes 14 are arranged on a region defined by the gate and data lines 22 and 24. Each of the TFT "S" includes a gate electrode 26, a source electrode 28 and the drain electrode 30. The gate electrode 26 extends from the gate line 22, and the source electrode 28 extends from the data line 24. The drain electrode 30 is electrically connected with the pixel electrode 14 through a drain contact hole 30'. Data and gate pads 21 and 23 are arranged at terminal portions of the gate and data lines 22 and 24, respectively. Storage capacitors "Cst" are formed over a portion of the gate line 22.

A process for manufacturing the LCD device described above is very complex. Especially, the lower array substrate is manufactured through several mask processes. The process of manufacturing the lower array substrate is explained below with reference with FIGS. 3A to 3E.

FIGS. 3A to 3E are cross sectional views taken long lines A—A and B—B of FIG. 2, respectively. First, as shown in FIG. 3A, a metal layer is deposited on a substrate 1 using a sputtering technique after removing alien substances and organic materials and cleaning the substrate to enforce an adhesion between the substrate 1 and the metal layer. Thereafter, the metal layer is patterned into a gate line 22 including a gate electrode 26 using a first mask. The gate line 22 is made of a low resistive material such as aluminum or molybdenum to lower a RC delay. Pure aluminum is a bad corrosion resistance and may cause a line defect due to a hillock in a subsequent process. Therefore, an aluminum alloy or a two or three-layered aluminum is usually used. A portion of the gate line 22 serves as a first capacitor electrode.

As shown in FIG. 31B, a gate insulating layer 50 is deposited on the exposed surface of the substrate 1 while covering the gate line 22 and the gate electrode 26. The gate insulating layer 50 has a thickness of 3000 Å and is usually made of SiNx or SiOx. A pure amorphous silicon layer 52 and a doped amorphous silicon layer 54 are sequentially deposited on the gate insulating layer 50. Then, the amorphous silicon layer 52 and the doped amorphous silicon layer 54 are patterned into an active layer 55 and a semiconductor island 53. The doped amorphous silicon layer 54 is called an ohmic contact layer and serves to reduce a contact resistance between the active layer 55 and a metal layer that will be formed in later process.

Subsequently, as shown in FIG. 3C, a metal layer is deposited on the semiconductor layers 53 and 55 and is patterned into source and drain electrodes 28 and 30 using a third mask. The source and drain electrode 53 and 55 are usually made of chromium or chromium alloy. At the same time as the source and drain electrodes 28 and 30, the data lines 24 are formed. A second capacitor electrode 58 is formed on the gate insulating layer 50 and overlaps a portion of the gate line 22 in order to form a storage capacitor. In other words, using the third mask, the data line 24, the source and drain electrodes 28 and 30, and the second capacitor electrode 58 are formed. Using the source and drain electrodes 28 and 30 as a mask, a portion of the ohmic contact layer 54 over the gate electrode 26 is etched. If the portion of the ohmic contact layer 54 over the gate electrode 26 is not etched, it brings about bad electrical characteristics and a bad performance of the TFT "S". Etching the portion of the ohmic contact layer 54 over the gate electrode 26 requires special attention. It is because the etching uniformity directly affects electrical characteristics of the TFT.

As shown in FIG. 3D, a passivation film 56 is formed over the substrate 1 using the fourth mask in order to protect the active layer 55. The passivation film 56 may affect electrical characteristics of the TFT due to an unstable energy state of the active layer 55 and alien substances generated during the etching process, and therefore it is usually made of an inorganic material such as SiNx and $SiO_2$ or an organic material such as benzocyclobutene (BCB). The passivation film 56 also requires a high light transmittance, a high humidity resistance and a high durability. The passivation film 56 includes two contact hole: the drain contact hole 30'; and a capacitor contact hole 58'.

Therefore, as shown in FIG. 3E, a transparent conducting oxide layer is deposited on the passivation film 56 and is patterned into the pixel electrode 14 using a fifth mask. The pixel electrode 14 is usually made of indium tin oxide (ITO). The pixel electrode 14 is electrically connected with the drain electrode 30 through the drain contact hole 30' and with the second capacitor electrode 58 through the capacitor contact hole 58'.

The process for manufacturing the conventional LCD device described above includes at least five masks. Further, when the gate electrode is made of aluminum, at least two masks are required to overcome an occurrence of the hillock that may be generated on the surface of the aluminum layer. Therefore, manufacturing the TFT array substrate basically requires five or six masks. Such a mask process includes various processes such as a cleaning, a depositing, a baking, an etching and the like. Therefore, even a reduction of one mask causes a short processing time, a low production cost and a high manufacturing yield.

For the foregoing reasons, there is a need for a liquid crystal display device manufactured by the mask process decreased in number.

SUMMARY OF THE INVENTION

To overcome the problems described above, preferred embodiments of the present invention provide a liquid crystal display device manufactured the mask process decreased in number and a method of manufacturing the same.

Preferred embodiments of the present invention further provide the liquid crystal display device having a short processing time and a high manufacturing yield.

In order to achieve the above object, the preferred embodiment of the present invention A method of manufacturing a liquid crystal display device, including: providing a substrate; depositing sequentially a first metal layer and a first insulating layer on the substrate; patterning the first metal layer and the first insulating layer using a first mask to form a gate line and a first gate insulating layer; depositing sequentially a second gate insulating layer, a pure semiconductor layer, a doped semiconductor layer and a second metal layer over the whole substrate; patterning the second metal layer using a second mask to form a data line, source and drain electrodes, a capacitor electrode, the capacitor electrode overlapping a portion of the gae line; etching the doped semiconductor layer between the source and drain electrodes to form a channel region; depositing a third insulating layer over the whole substrate; patterning the third insulating layer using a third mask to form a passivation film, the passivation film having a smaller width than the data line and covering the source and drain electrodes and exposing a portion of the drain electrode and the capacitor electrode; depositing a transparent conductive material layer over the whole substrate; and patterning the transparent conductive material layer using a fourth mask to pixel electrode, the pixel electrode contacting the drain electrode.

The gate line includes a gate pad formed at its terminal portion, the gate pad including at least one pad contact hole. The method further includes forming gate pad electrode using the fourth mask, the gate pad electrode contacting the gate pad through at least one pad contact hole. A crossing portion between the gate line and data line is insulated by the second insulating layer, the pure semiconductor layer and the doped semiconductor layer.

The preferred embodiment of the present invention further provides a liquid crystal display device, including: a substrate; a thin film transistor formed on the substrate, including: a gate line having a gate electrode; first and second insulating layers; an active layer; and source and drain electrodes; a pixel electrode overlapping a portion of the gate lines and contacting the drain electrode; and a storage capacitor including: a portion of the gate line as a first electrode; a second electrode overlapping the portion of the gate line; and the first and second insulating layers, the pure semiconductor layer and the doped semiconductor layer interposed between the gate line and the pixel electrode as a dielectric layer.

The LCD device according to the preferred embodiment of the present invention has the following advantages. First, since the LCD device can be manufactured using only four masks, the processing time becomes decreased and the manufacturing yield is high. Further, since the process is reduced in number, the production cost is low. Since the gate pads include a plurality of the pad contact holes, a contact resistance between the pixel electrode and the gate pad becomes lowered due to the side contact.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiment of the present invention, example of which is illustrated in the accompanying drawings.

Figure 4:
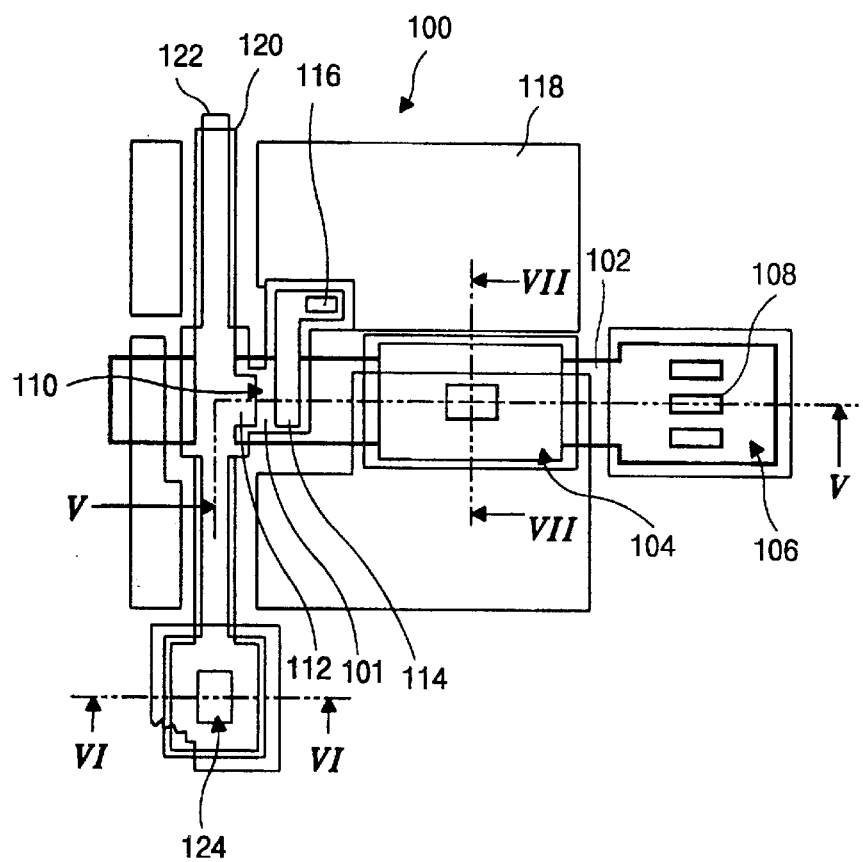
FIG. 4 is a plan view illustrating an array substrate of an LCD device according to a preferred embodiment of the present invention.

FIG. 4 is a plan view illustrating a lower array substrate of a liquid crystal display (LCD) device according to the preferred embodiment of the present invention. As shown in FIG. 4, gate lines 102 are arranged in a transverse direction and data lines 120 are arranged in a longitudinal direction perpendicular to the gate lines 102. The TFTs are arranged near a crossing point of the gate and data lines 102 and 120. The pixel electrodes 118 are arranged on a region defined by the gate and data lines 102 and 120. Each of the TFT includes a gate electrode 101, a source electrode 112 and the drain electrode 114. The gate electrode 101 extends from the gate line 102, and the source electrode 112 extends from the data line 114. The drain electrode 114 is electrically connected with the pixel electrode 118 through a drain contact hole 116. Data and gate pads 106 and 124 are arranged at terminal portions of the gate and data lines 102 and 120, respectively. Storage capacitors are formed over a portion of the gate line 102.

Figure 1:
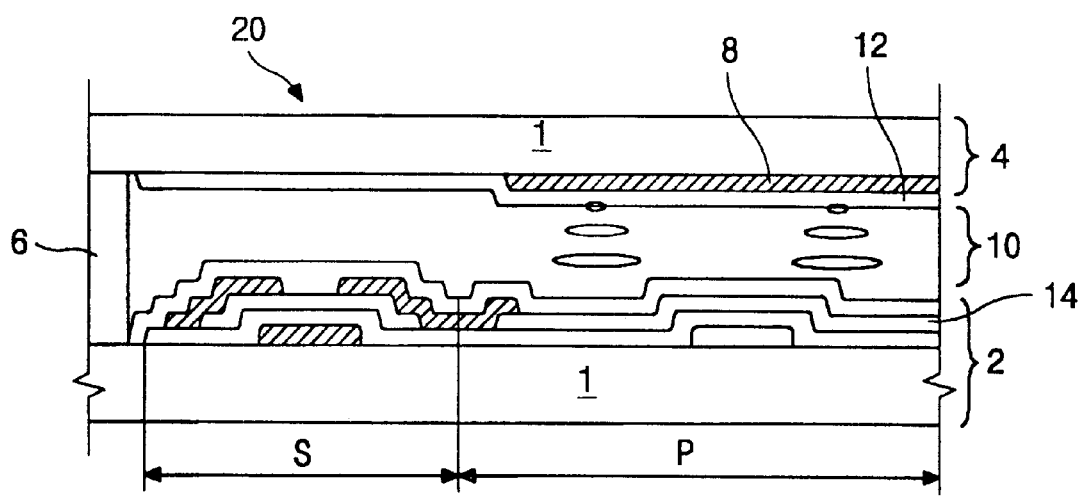
FIG. 1 is a cross sectional view illustrating a typical liquid crystal display (LCD) device.
Figure 2:
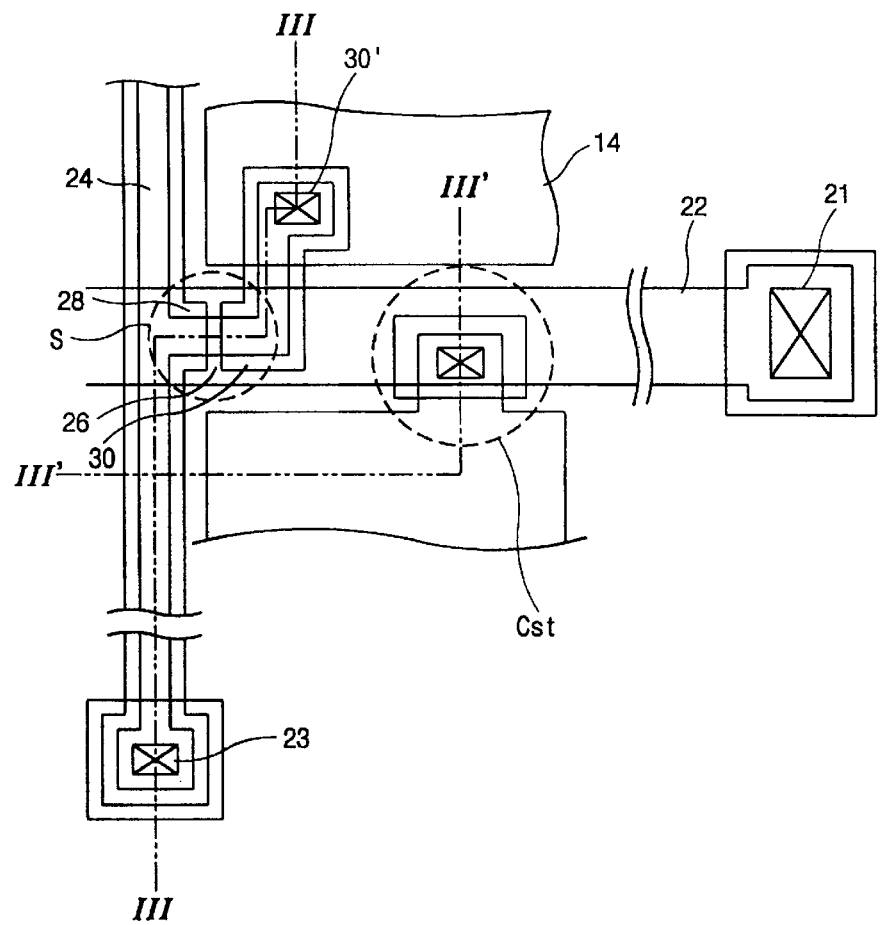
FIG. 2 is a plan view illustrating an array substrate of the typical LCD device.
Figure 3A:
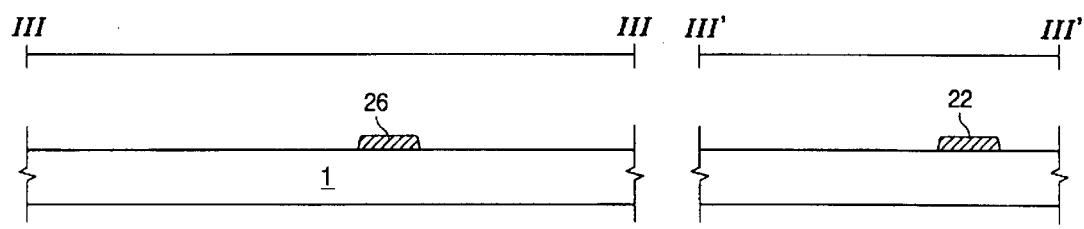
FIGS. 3A to 3E are cross sectional views taken along lines A—A and B—B of FIG. 2.
Figure 3B:
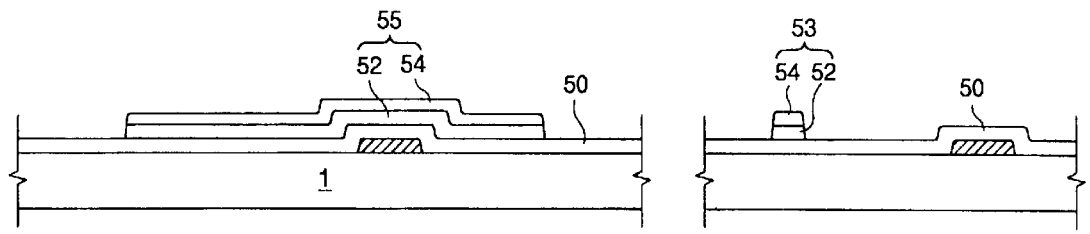
Figure 3C:
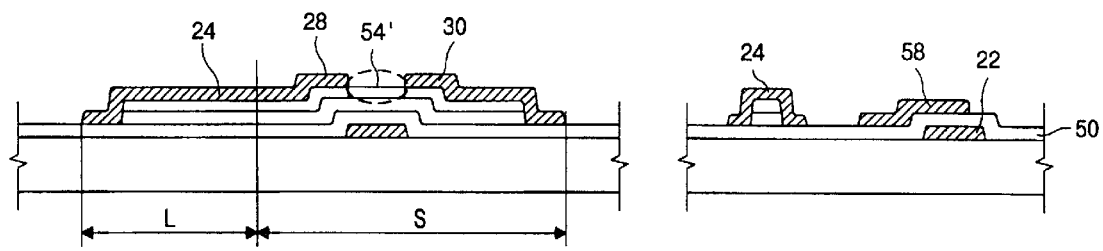
Figure 3D:
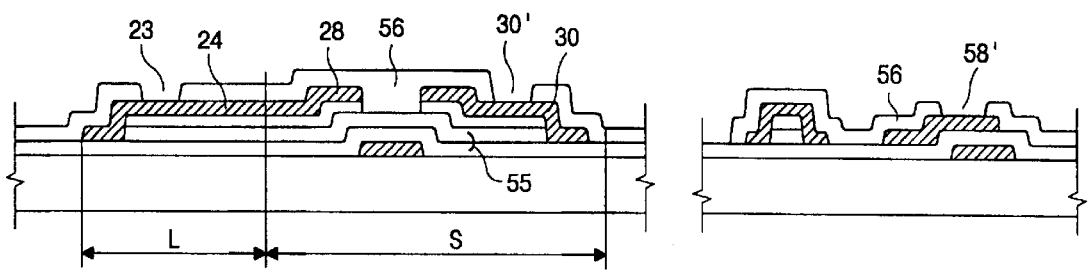
Figure 3E:
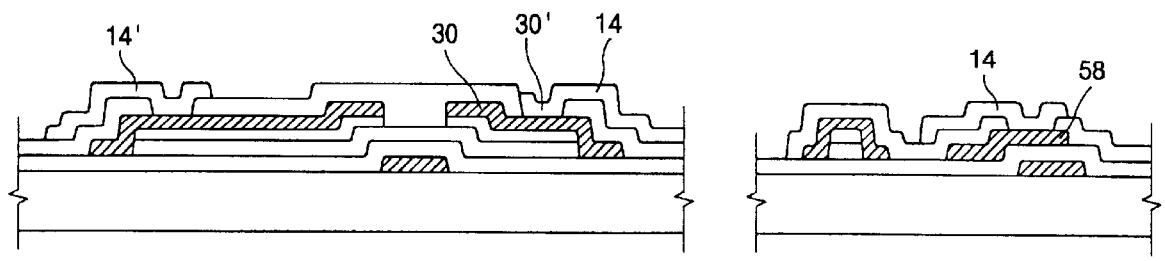

A process for manufacturing the LCD device according to the preferred embodiment of the present invention is explained below with reference with FIGS. 5A to 3D.

Figure 5A:
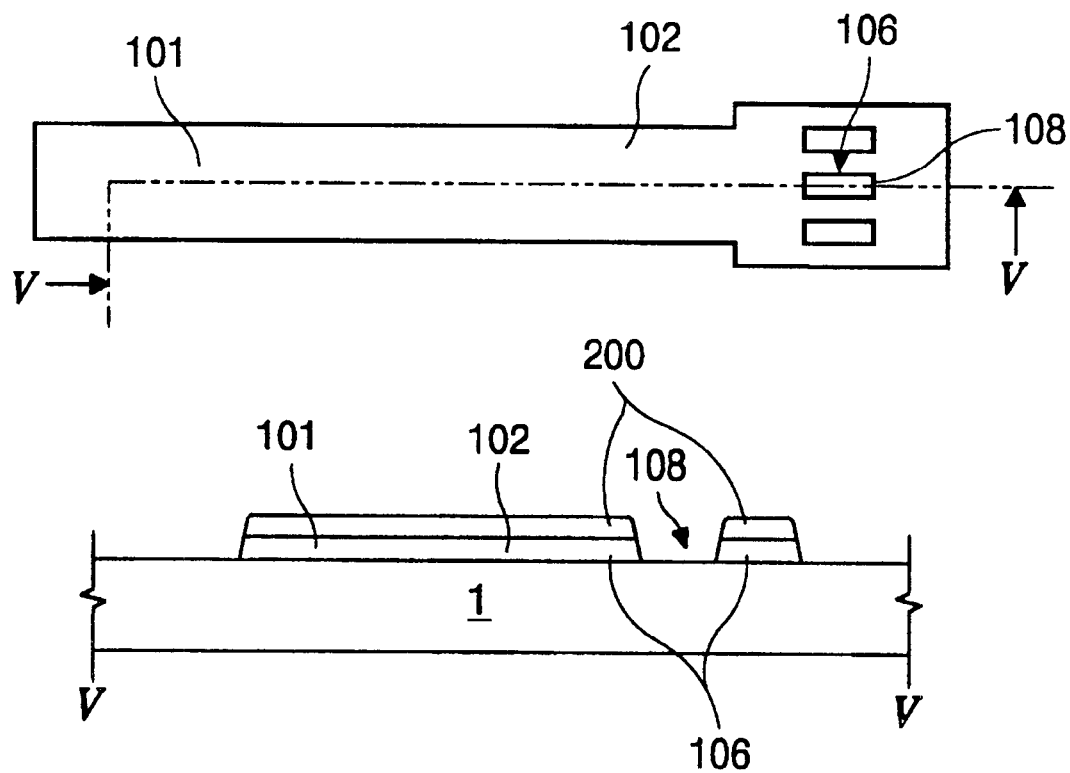
FIGS. 5A to 5D are plan views and cross sectional views taken along lines □—□ of FIG. 4.

FIGS. 5A to 5D are plan views and cross sectional views taken long lines □—□ of FIG. 4. First, as shown in FIG. 5A, a first metal layer and a first insulating layer are sequentially deposited on a substrate I and is patterned into the gate line 102 and a gate insulating layer 200 using a first mask. The gate line 102 includes the gate electrode 101. In FIG. 5A, the gate electrode 101 seems like a portion of the gate line 102, but the gate electrode 101 may extend from the gate line 102. The gate line 102 is made of aluminum, chromium, molybdenum or aluminum alloy, for example, having the dual-layered structure of AINd/Mo. The gate pads 106 are formed at a terminal portion of the gate lines 102. Preferably, the gate pads 106 include a plurality of pad contact holes 108. Through the pad contact hole 108, the gate pad 106 is electrically connected with the transparent conductive electrode that will be formed in subsequent process. When the gate pad 106 includes a plurality of the pad contact holes 108, a contact resistance between the gate pad 106 and the transparent conductive electrode becomes lowered.

Figure 5B:
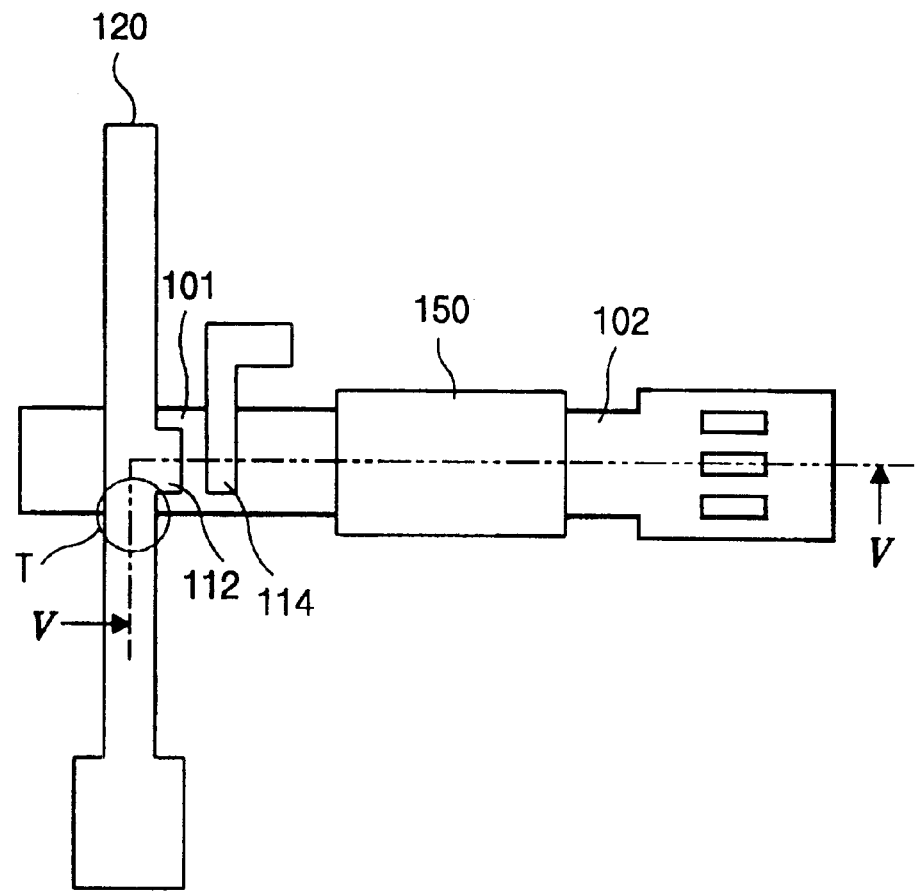
Figure 5B:
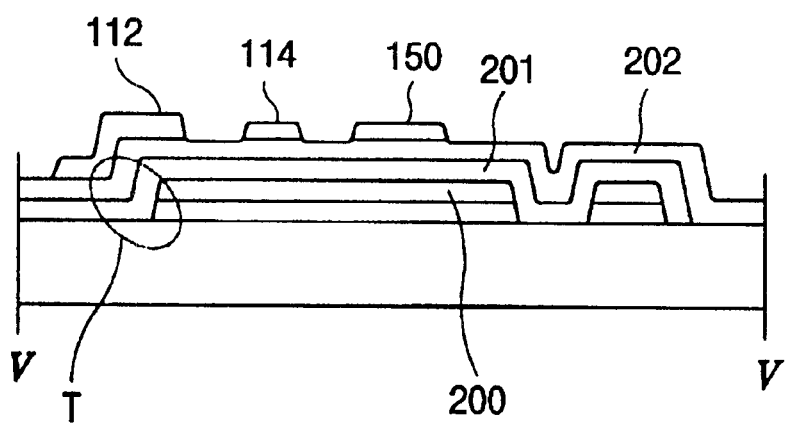

Subsequently, as shown in FIG. 5B, a semiconductor layer 202 and a second metal layer are sequentially deposited on the gate insulating layer 200 and are patterned into source and drain electrodes 112 and 114, a capacitor electrode 150 using a second mask. Thereafter, using the source and drain electrodes 112 and 114 as a mask, a portion of the semiconductor layer 202 is etched. The semiconductor layer 202, even though not shown, includes a doped semiconductor layer and a pure semiconductor layer. In other words, excluding a portion of the semiconductor layer 202 under the patterned second metal layer, the rest portion of the semiconductor layer 202 is etched in order to decrease a leakage current. A second insulating layer 201 is formed on the gate insulating layer 200. The reason is to prevent a possible line short at a step portion "T" between the gate line 102 and the data line 120.

Figure 5C:
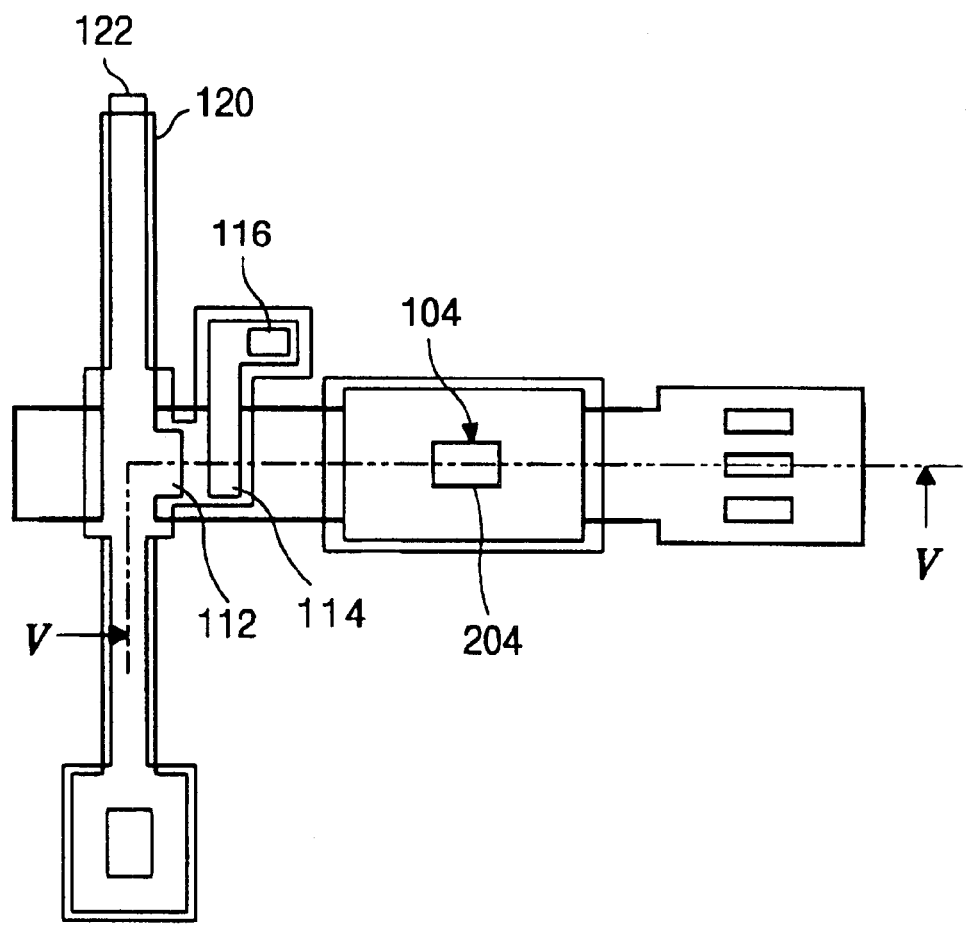
Figure 5C:
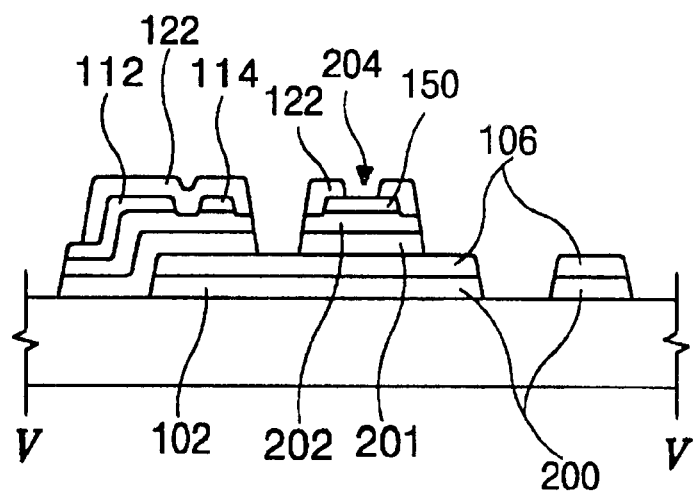

Then, as shown in FIG. 5C, a third insulating layer is deposited over the whole substrate 1 and is patterned into a passivation film 122 using a third mask. At this point, the semiconductor layer 202 and the second insulating layer 201 excluding a portion under the patterned passivation film 122 are etched at the same time. The gate line 102 including the gate pad 106 is protected by the gate insulating layer 200. The passivation film 122 includes a capacitor contact hole 204 and a drain contact hole 116. The capacitor contact hole 204 is formed over the capacitor electrode 150, and the drain contact hole 116 is formed over the drain electrode 114.

Figure 5D:
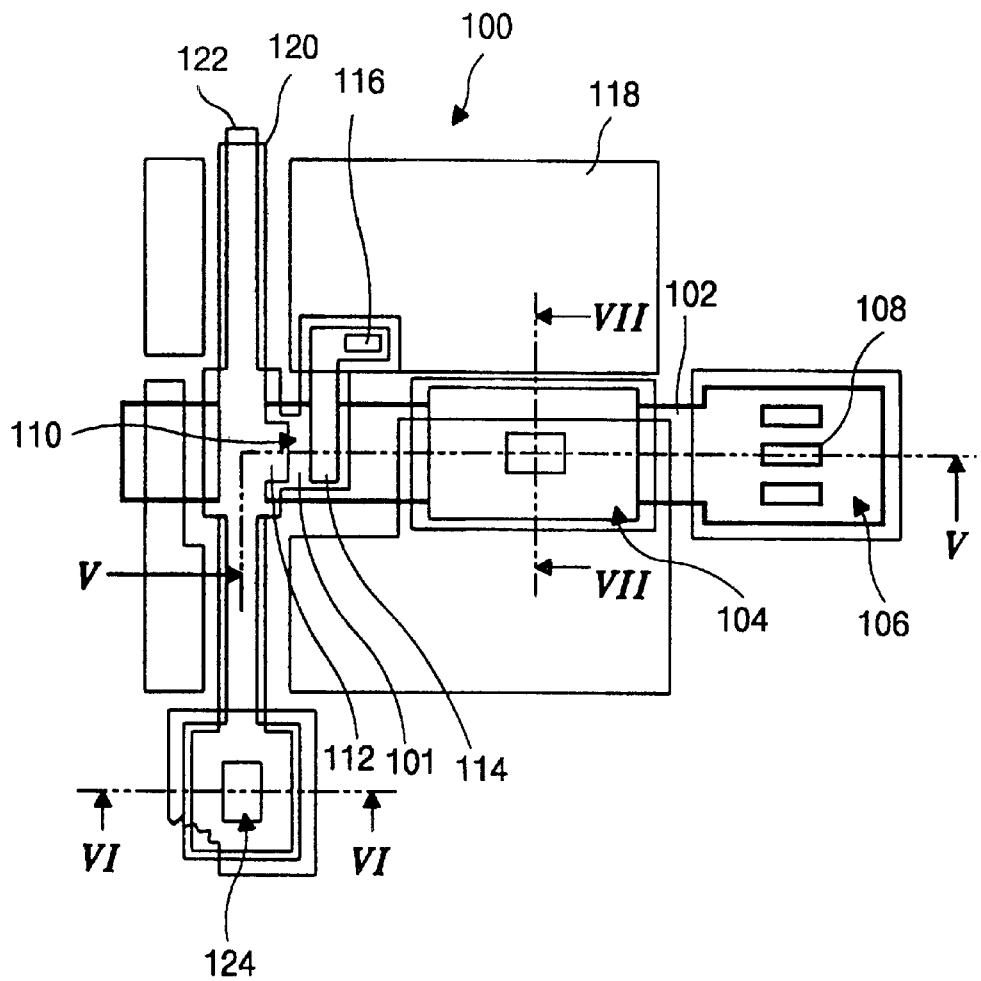
Figure 5D:
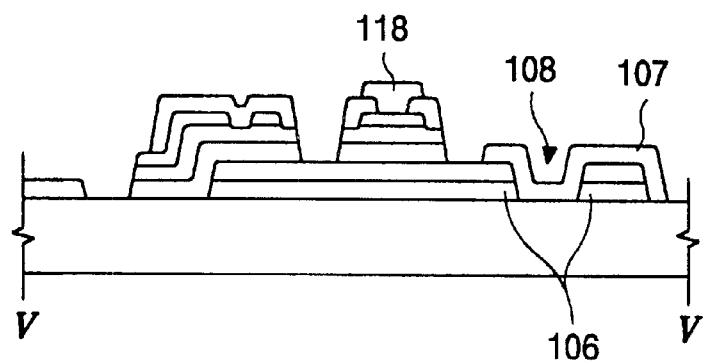

Finally, as shown in FIG. 5D, a transparent conductive material layer is deposited on the passivation film 122 and is patterned into the pixel electrode 118 using a fourth mask. The pixel electrode 118 is electrically connected with the drain electrode 114 through the drain contact hole 116 and with the capacitor electrode 150 through the capacitor contact hole 203, respectively. A gate pad electrode 107 is formed over the gate pad 106 for a side-contact with the gate pad 106.

Figure 6:
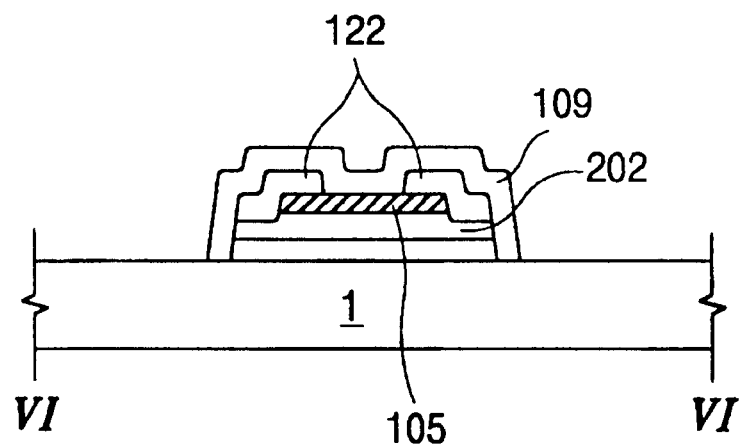
FIG. 6 is a cross sectional view taken along line□—□ of FIG. 5D.

FIG. 6 is a cross sectional view taken along line □—□ of FIG. 5D, illustrating the data pad. As shown in FIG. 6, the semiconductor layer 202 is formed over the substrate 1. The data pad 105 is patterned on the semiconductor layer 202, the passivation film 122 overlaps both end portions of the data pad 105. A data pad electrode 109 covers the passivation film 122 to electrically contact the data pad 105. At this point, the gate and data pad electrodes 107 and 109 substantially contact with the external drive circuit (not shown).

Figure 7:
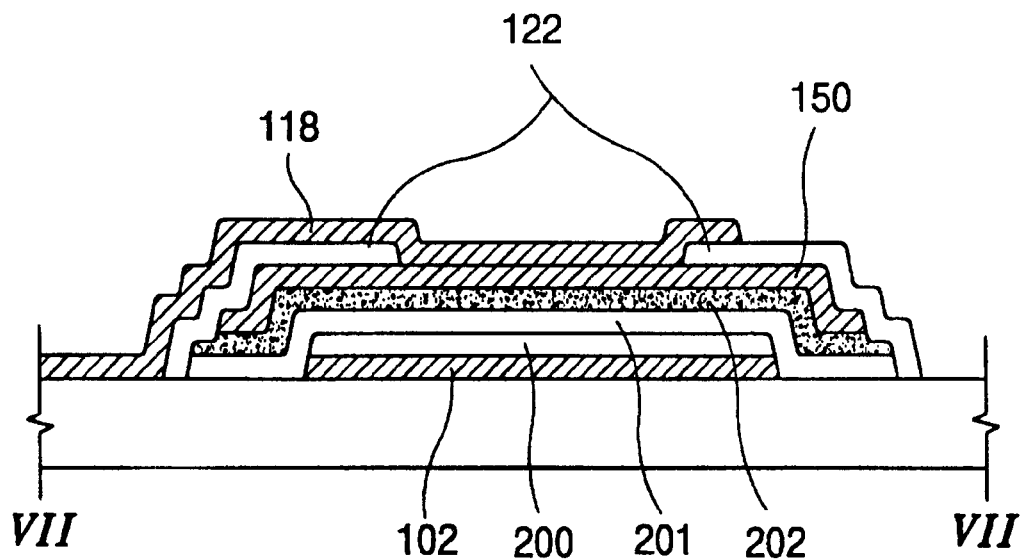
FIG. 7 is a cross sectional view taken along line □—□ of FIG. 5D.

FIG. 7 is a cross sectional view taken along line □—□ of FIG. 5D, illustrating the storage capacitor. As shown in FIG. 7, the storage capacitor includes the gate line 102 as a first capacitor electrode and the capacitor electrode 150 as a second capacitor electrode. The gate insulating layer 200 and second insulating layer 201 are used as a dielectric layer. The pixel electrode 118 serves as an electrode for withdrawing charges and is electrically connected with the capacitor electrode 150.

As described above, a crossing portion between the gate line and the data line is insulated by the second insulating layer. When the gate lines are formed using the first mask, the gate pad contact hole is formed. Further, since the gate pads include a plurality of the pad contact holes, a contact resistance between the pixel electrode and the gate pad becomes lowered due to the side contact.

The LCD device according to the preferred embodiment of the present invention has the following advantages. First, since the LCD device can be manufactured using only four masks, the processing time becomes decreased and the manufacturing yield is high. Further, since the process is reduced in number, the production cost is low. Since the gate pads include a plurality of the pad contact holes, a contact resistance between the pixel electrode and the gate pad becomes lowered due to the side contact.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of manufacturing a liquid crystal display device, comprising:

providing a substrate;

depositing sequentially a first metal layer and a first insulating layer on the substrate;

patterning the first metal layer and the first insulating layer together using a first mask to form a gate line and a first gate insulating layer;

depositing sequentially a second gate insulating layer, a pure semiconductor layer, a doped semiconductor layer and a second metal layer over the whole substrate;

patterning the second metal layer using a second mask to form a data line, source and drain electrodes, a capacitor electrode, the capacitor electrode overlapping a portion of the gate line;

etching the doped semiconductor layer between the source and drain electrodes to form a channel region;

depositing a third insulating layer over the whole substrate;

patterning the third insulating layer using a third mask to form a passivation film, the passivation film having a smaller width than the data line and covering the source and drain electrodes and exposing a portion of the drain electrode and the capacitor electrode;

depositing a transparent conductive material layer over the whole substrate; and patterning the transparent conductive material layer using a fourth mask to pixel electrode, the pixel electrode contacting the drain electrode.

2. The method of claim 1, wherein the gate line includes a gate pad formed at its terminal portion, the gate pad including at least one pad contact hole.

3. The method of claim 1, further comprising, forming gate pad electrode using the fourth mask, the gate pad electrode contacting the gate pad through at least one pad contact hole.

4. The method of claim 1, wherein a crossing portion between the gate line and data line is insulated by the second insulating layer, the pure semiconductor layer and the doped semiconductor layer.

\* \* \* \* \*